Aug. 10, 1926.
G. M. SCHERER
1,595,167
TYPEWRITING MACHINE
Filed Jan. 19, 1926
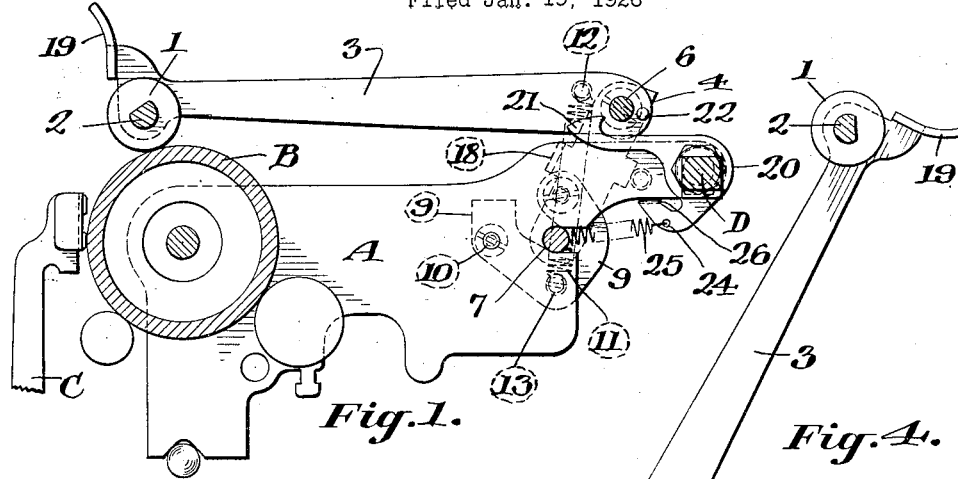
Fig. 1.
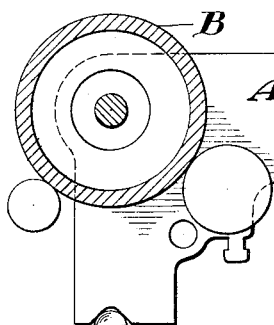
Fig. 2.
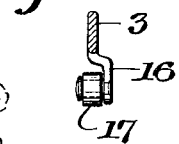
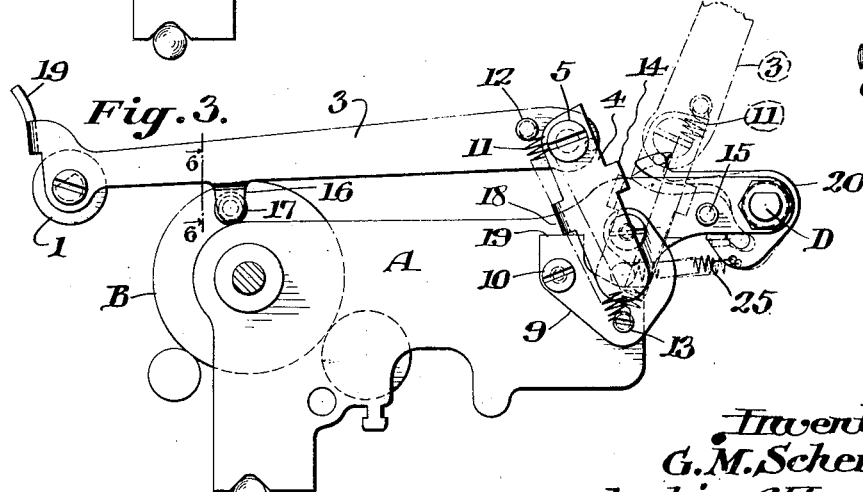
Inventor
G. M. Scherer
by his Attorneys
Baldwin & Wight Patented Aug. 10, 1926.

1,595,167

UNITED STATES PATENT OFFICE.

GILBERT M. SCHERER, OF NEW YORK, N. Y., ASSIGNOR TO ROYAL TYPEWRITER COMPANY, INC., OF NEW YORK, N. Y., A CORPORATION OF NEW YORK.

TYPEWRITING MACHINE.

Application filed January 19, 1926. Serial No. 82,343.

The invention relates to paper feeding and guiding mechanism of typewriting machines and is in the nature of an improvement upon the mechanism shown in the patent to Dowd, 1,547,305, July 28, 1925. In the construction shown in said patent there is a movable frame pivoted to the typewriter carriage frame and a roll carrying bail is pivoted to said movable frame. This permits the bail and frame to be moved forward from an operative position in which the rolls bear against the platen to a position in which the rolls are in front of the platen, thus permitting the easy insertion or adjustment of paper or cards. At the same time the roll carrying bail may be moved about its pivotal connection with the frame to a rearward inoperative position in which the sides of the bail and frame are substantially in a direct line and are spring held in this relation. It follows from this that when the bail is moved forward to operative position the bail and frame will turn as a unit and the rolls will therefore reach the position in front of the platen instead of the operative position in engagement with the platen, thereby necessitating an additional movement on the part of the operator.

This invention provides mechanism whereby when the roll carrying bail is in its rear inoperative position and is moved forward the greater part of the movement will be about the pivots connecting the bail and frame so that the bail moves directly to its operative position with the rolls engaging the platen.

In the drawings:

Figure 1 is a side view with parts in section, showing the roll carrying bail in its operative position.

Figure 2 is a similar view showing the roll carrying bail in its rear inoperative position.

Figure 3 is a similar view showing the bail and frame moved forward to bring the rolls in front of the platen, and showing in dotted lines a portion of the rear inoperative position of the parts.

Figure 4 is an edge view of a latch member.

Figure 5 is a face view of the same.

Figure 6 is a section on the line 6—6 of Figure 3.

The invention is independent of any particular type of typewriting machine and accordingly there is shown in the drawings merely the side frame A of the carriage, the platen B mounted therein, type bar C in its printing position, and a rod D which is or may be the usual stop carrying rod for tabulating and margin stops. These parts may be of any old or desired construction and as illustrated disclose the structure of the well known Royal machine.

It is further to be understood that the reference to typewriting machines is intended to cover combined typewriting and adding machines, computing machines, or similar machines to which the invention may be applicable.

Rotatable rolls 1 are carried by a rod 2 which is supported in the front ends of arms 3 which arms are pivoted at their rear ends to links 4, by means of screws 5 which pass through said arms and links and thread into the ends of a rod 6. The rod 2 and side arms 3 and rod 6 form a rectangular frame of light but strong construction which is referred to throughout as a roll carrying bail. The links 4 are connected at their lower ends by a rod 7 which is mounted in a cut out 8 in the rear of the carriage side frames and is held positioned by means of yokes 9 which are attached to the side frames by means of screws or similar fastenings 10. Springs 11 are attached at one end to pins 12 on the side arms 3 and at their other ends to pins 13 carried by the yokes 9. The position of the spring is such relative to the pivot points of the side arms 3 that it tends to hold the rolls 1 in engagement with the platen when in the operative position of Figure 1 and also holds the side arms 3 and bail in inoperative position as shown in Figure 2.

Projections 14 act with stops 15 carried by the side frames of the carriage to limit the rearward movement of the links 4. One of the side arms 3 of the roll carrying bail may be provided with an offset lug 16 in which is mounted a roller 17 which engages the top of the carriage frame when the bail is moved to its forward position as shown in Figure 3. A bent ear 18 on each of the links 4 contacts with the upper edge 19 of the yokes 9 to limit the extent of the forward sliding movement shown in Figure 3.

The above described parts except for the roller 17 are substantially the same as those illustrated in the Dowd patent. In this construction if the roll carrying bail is moved forward from the Figure 2 position the bail and the links 4 will move as a unit and the parts will move to the Figure 3 position in which the rolls are in front of the platen. The operator is then obliged to push the roll carrying bail backwardly moving the links 4 about their pivots and bringing the parts to the operative position shown in Figure 1. This invention has for its purpose the provision of means which will overcome this objectionable feature and will cause the bail to move directly from the Figure 2 position to the Figure 1 position.

A latch 20 shown in side elevation in Figure 5 is mounted on the stop rod D just inside the carriage frame. It has an upper hook portion 21 which engages a pin 22 on the side arms 3 of the roll carrying bail when the parts are moved to the Figure 2 position. The latch also has a lower arm 23 to which is attached at 24 one end of a spring 25 the other end of which hooks around the rod 7. This spring tends to draw the latch to its upper operative position and its movement under influence of the spring is limited by an offset ear 26 on the arm 23 which engages the side frame of the carriage, as clearly shown in the drawings.

The pin 22 and hook 21 are so positioned that when the parts are moved to the rear inoperative position shown in Figure 2 and it is desired to move the roll carrying bail forward, a pull on the roll carrying bail through the finger piece 19 will cause the bail to turn about the pivotal axis 6 since the bail and links 4 cannot move forward as a unit because of the engagement of the hook 21 with the pin 22. After the bail 3 is moved through the greater part of its pivotal movement, the hook 21 and pin 22 are out of operative relation to the parts thus moved sufficiently so that the spring 11 moves the bail substantially downward and brings the parts directly to the Figure 1 position. It will be noted that this mechanism in no way interferes with the movement of the parts from the Figure 1 position to that in Figure 3. In the rearward movement of the bail from the Figure 1 position to that shown in Figure 2, the hook 21 and the pin 22 do not come into operative engagement until this movement has been substantially completed. If it is desired, however, to swing the parts from the Figure 3 position to that shown in Figure 2 and the bail is first moved about its pivotal axis into direct line with the links 4, after which the links and bail move as a unit about the pivotal axes of the links, then at such time the pin 22 will engage the top curved surface of the latch 21 and cam the same downward against the tension of the spring 25 until the parts have reached the Figure 2 position whereupon the latch snaps up in front of the pin 22 as before.

It will be evident that the invention provides a frame pivotally mounted on the carriage and a roll carrying bail pivotally mounted on said frame and compels movements of the bail about its pivotal connections with the frame when the bail is moved forward from inoperative to operative position. Stated in another way, the invention discloses a roll carrying bail mounted to turn about two axes and means which compel a movement about one of said axes when the bail is moved from inoperative to operative position. It is also evident that various details may be modified without in any way departing from the spirit of the invention which is to be regarded as limited only by the scope of the appended claims.

I claim:

1. In a typewriting machine having a carriage and a platen mounted therein, links pivoted at their lower ends to the carriage frame, a roll carrying bail pivoted to the free ends of said links and having a fore and aft movement, and means compelling the bail to turn about the pivotal points of bail and links as the bail is swung forward from inoperative to operative position.

2. In a typewriting machine having a carriage and a platen mounted therein, links pivoted at their lower ends to the carriage frame, a roll carrying bail pivoted to the free ends of said links and having a fore and aft movement, and means carried by the carriage frame compelling the bail to turn about the pivotal points of bail and links as the bail is swung forward from inoperative to operative position.

3. In a typewriting machine having a carriage and a platen mounted therein, links pivoted at their lower ends to the carriage frame, a roll carrying bail pivoted to the free ends of said links and having a fore and aft movement, and latch mechanism compelling the bail to turn about the pivotal points of bail and links as the bail is swung forward from inoperative to operative position.

4. In a typewriting machine having a carriage and a platen mounted therein, a rocking frame pivoted to the carriage frame, a roll carrying bail pivoted to said rocking frame, and means compelling the bail to turn about its pivotal connection with the rocking frame as the bail is swung forward from inoperative to operative position.

5. In a typewriting machine having a carriage and a platen mounted therein, a rocking frame pivoted to the carriage frame, a roll carrying bail pivoted to said rocking frame, and means preventing movement of the rocking frame during the major portion of the swinging movement of the bail forward from inoperative to operative position.

6. In a typewriting machine having a carriage and a platen mounted therein, a rocking frame pivoted to the carriage frame, a roll carrying bail pivoted to said rocking frame, and latch mechanism preventing movement of the rocking frame during the major portion of the swinging movement of the bail forward from inoperative to operative position.

7. In a typewriting machine having a carriage and a platen mounted therein, a rocking frame pivoted to the carriage frame, a roll carrying bail pivoted to said rocking frame, and a latch carried by the carriage frame and engaging said bail preventing movement of the rocking frame during the major portion of the swinging movement of the bail forward from inoperative to operative position.

8. In a typewriting machine having a carriage and a platen mounted therein, a rocking frame pivoted to the carriage frame, a roll carrying bail pivoted to said rocking frame, and means preventing effective movement of the rocking frame when the bail is in its rear inoperative position.

9. In a typewriting machine having a carriage and a platen mounted therein, a rocking frame pivoted to the carriage frame, a roll carrying bail pivoted to said rocking frame, and a spring pressed latch preventing effective movement of the rocking frame when the bail is in its rear inoperative position.

10. In a typewriting machine having a carriage and a platen mounted therein, a movable frame, a roll carrying bail attached to said frame and movable thereon to a rear inoperative position, and means compelling independent movement of said bail when it is swung forward to operative position.

11. In a typewriting machine having a carriage and a platen mounted therein, a movable frame carried by the carriage frame, a rail carrying bail movable on said movable frame to a rear inoperative position, and latch means preventing effective movement of the movable frame during the greater portion of the forward movement of the bail to operative position.

12. In a typewriting machine, paper feeding mechanism comprising a roll carrying bail mounted for movement about two axes, and means compelling movement about one axis before it can move about the other as the bail is moved forward from inoperative to operative position.

13. In a typewriting machine, paper feeding mechanism comprising a roll carrying bail mounted for movement about two axes, and latch mechanism which compels movement about one axis as the bail is moved forward from inoperative to operative position.

14. In a typewriting machine, paper feeding mechanism comprising a roll carrying bail mounted for movement about two axes, and latch mechanism which becomes effective when the bail is moved to its rear inoperative position and thereafter compels movement about one axis when the bail is moved forward from inoperative to operative position.

15. In a typewriting or similar machine, paper feeding mechanism comprising a roll carrying bail mounted to move to an operative position with the rolls engaging the platen, an inoperative position with the bail in the rear of the platen, and a position with the rolls in front of the platen, and means causing the bail to move directly to said operative position when moved forwardly from said inoperative position.

In testimony whereof, I have hereunto subscribed my name.

GILBERT M. SCHERER.